United States Patent [19]

Ooi et al.

[11] Patent Number: 4,923,287
[45] Date of Patent: May 8, 1990

[54] SPATIAL LIGHT MODULATING DEVICES UTILIZING ELECTRO-OPTIC CRYSTAL

[75] Inventors: Yoshiharu Ooi; Tsutomu Hara, both of Shizuoka, Japan

[73] Assignee: Hamamatsu Photonics Kabushiki Kaisha, Shizuoka, Japan

[21] Appl. No.: 300,986

[22] Filed: Jan. 24, 1989

[30] Foreign Application Priority Data

Jan. 25, 1988 [JP] Japan .................................. 63-15289

[51] Int. Cl.$^5$ .............................................. G02F 1/01
[52] U.S. Cl. ..................................... 350/355; 350/392
[58] Field of Search ............... 350/353, 356, 385, 392, 350/393, 374

[56] References Cited

U.S. PATENT DOCUMENTS

| 4,481,531 | 11/1984 | Warde et al. | 358/60 |
| 4,678,286 | 7/1987 | Hara | 350/356 |
| 4,741,602 | 3/1988 | Hara et al. | 350/356 |

FOREIGN PATENT DOCUMENTS 59-166916 9/1984 Japan .

OTHER PUBLICATIONS

Hara, T. et al., "A Spatial Light Modulator", Advances in Electronics and Electron Physics, vol. 64B, pp. 637-647, 1985.
Warde, C. et al., "Microchannel Spatial Light Modulator", Optics Letters, vol. 3, Nov. 1978, pp. 196-198.
Warde, C. et al., "Operating Modes of the Microchannel Spatial Light Modulater", Optical Engineering, vol. 22, No. 6, Nov./Dec. 1983, pp. 695-703.
Hara, T. et al., "Microchannel Spatial Light Modulator with Improved Resolution and Contrast Ratio", SPIE, vol. 613, (1986), pp. 153-157.

Primary Examiner—Eugene R. LaRoche
Assistant Examiner—Nathan W. McCutcheon
Attorney, Agent, or Firm—Finnegan, Henderson, Farabow, Garrett and Dunner

[57] ABSTRACT

A spatial light modulating device has a light modulating means which comprises a substrate which is transparent with respect to readout light and whose first surface is coated with a first transparent conductive film, an electro-optic crystal plate whose first surface being opposed to the first surface of the substrate is coated with a second transparent conductive film, an adhesive layer for bonding the substrate and the electro-optic crystal plate, and conductive substances disposed in the adhesive layer so as to electrically connect the first and second transparent conductive films.

7 Claims, 3 Drawing Sheets

SPATIAL LIGHT MODULATING DEVICES UTILIZING ELECTRO-OPTIC CRYSTAL

BACKGROUND OF THE INVENTION

The present invention relates to spatial light modulating devices in which a refractive index distribution of an electro-optic crystal is changed in accordance with an input optical or electron image and the stored image is read out through modulation of readout light in accordance with the refractive index distribution.

FIG. 1 shows a "PROM" (Pockels Readout Optical Memory) structure which comprises a BSO ($Bi_{12}SiO_{20}$) single crystal wafer 101. The BSO crystal exhibits both of a photoconductive effect and an electro-optic effect. In FIG. 1, both surfaces of the BSO wafer 101 are coated with transparent conductive films 103, 104 for voltage application through an insulator (parylene) 102. When, under the application of appropriate voltage between the transparent conductive films 103, 104 an image carried by ultraviolet light or blue light is formed on one crystal surface, electron-hole pairs (electric charges) are generated at the illuminated areas and the electric charges are trapped in a boundary between the insulator 102 and the crystal 101 by means of a drift electric field caused by the applied voltage. An internal electric field distribution, which is formed by the trapped electric charges, causes a refractive index distribution of the crystal 101 through the electro-optic effect, where the crystal 101 has a double refraction property. In order to avoid erasing the input image, infrared light or red light is made incident on the other surface of the crystal 101 as a readout light. The readout light is modulated in accordance with the refraction index distribution when it is reflected by the crystal surface. This means readout of the input optical image.

FIG. 2 shows a "Photo-Titus" structure which utilizes a DKDP (Deuterated Potassum Dihydrogen Phosphate, $KD_2PO_4$) crystal 111. A photoconductive layer (amorphous Se) 113 is formed on a front surface of the DKDP crystal 111 through a dielectric mirror 112. Moreover, both surfaces are coated with transparent conductive films 114, 115. When an input image is formed on the photoconductive layer 113, the input image is transformed into an electric charge image and stored in a boundary between the dielectric mirror 112 and the photoconductive layer 113. A refractive index distribution of the DKDP crystal 111 is changed by an internal electric field distribution which has been formed in accordance with the electric charge image, where the DKDP crystal 111 has a double refraction property. The refractive index distribution can be read out by making readout light incident on a back surface of the DKDP crystal 111, where the readout light is modulated when it is reflected. This means readout of the input optical image. In another structure called "Titus", image information is inputted by scanning the front surface of the DKDP crystal 111 with an electron beam which is emitted from an electron gun, instead of incorporating the photoconductive layer 113.

FIG. 3 shows the constitution of a microchannel spatial light modulator (MSLM) 3. A photocathode 5 and a light modulating plate 9 consisting of an electro-optic crystal ($LiNbO_3$) are equipped on respective end surfaces of a vacuum-sealed cylindrical tube 4. Between the photocathode 5 and the light modulating plate are disposed a focusing electrode 6 which focuses electron beams carrying an electron image which has been emitted from the photocathode 5 on a surface 92 of the light modulating plate 9, and a trapping electrode 8 which traps secondary electrons which are backwardly emitted from the surface 92 of the light modulating plate 9. An electron amplifier 7 such as a microchannel plate (MCP) is incorporated when it is required. The MCP amplifies an input electron image through a secondary electron amplifcation phenomenon.

With the above-described constitution, prescribed voltages are applied to the electrodes from respective voltage supplies A, B, C and D. When an optical image is projected on the photocathode 5, electrons are emitted therefrom corresponding to the projected optical image. The emitted electrons are then focused, amplified, accelerated and finally made incident on the surface 92 of the light modulating plate 9. An electric charge image is formed through direct charging by the incident electron beams or through secondary electron emission. The light modulating plate 9 is made by polishing a $LiNbO_3$ crystal extremely precisely to form a plate of uniform thickness. An electrode 91 is closely contacted to the other surface of the light modulating plate 9. A refractive index distribution is changed by an electric field distribution which is formed by the electric charge image on the surface 92 and the voltage applied to the electrode 91.

Light beams emitted from a point light source 13 pass through a focusing lens 12, a monochrome filter 11 and a half-mirror 10 and are normally made incident on the light modulating plate 9. The incident light beams are modulated in accordance with the refractive index distribution, so that light beams reflected from the light modulating plate 9 produces, after reflected by the half mirror 10, an output optical image corresponding to the input optical image on a surface 14.

In this manner, the microchannel spatial light modulator 3 can amplify the input optical image and, if the point light source 13 is a laser light source, can convert an optical image of incoherent light into an optical image of coherent light.

Instead of using the photocathode 5 and the MCP 7, the electric charge image may be formed on the light modulating plate 9 by scanning the light modulating plate 9 with an electron beam emitted from an electron gun.

In the meantime, in such spatial light modulating devices as described above which utilize an electro-optical crystal, the spatial resolution of the device greatly depends on the thicknes of the electro-optic crystal. This will be explained hereinafter in the case of the microchannel spatial light modulator 3 shown in FIG. 3.

As shown in FIG. 4A, if the light modulating plate 9 is relatively thick, an electric field caused by an electric charge at a minute point P on the surface 92 widely extends around the point P as indicated by a symbol $\delta_1$. On the other hand, as shown in FIG. 4B, if the light modulating plate 9 is relatively thin, an electic field caused by an electric charge at a minute point P narrowly extends around the point P as indicated by a symbol $\delta_2$. For example, while the spatial resolution with the crystal of 300 μm in thickness is about 2 lp (line pairs)/mm, it is improved up to about 10 lp/mm with the crystal of 50 μm in thickness.

The electro-optic 9 can be polished to the thickness of approximately 300 to 500 μm with satisfactory parallelization and flatness. However, a usual polishing method cannot realize the crystal thickness less than the above value without curving the crystal. A curved crystal is not suitable for actual use.

In order to overcome this problem, the technique disclosed in Japanese Patent Application Unexamined Publication No. 166916/1984 was proposed. With this technique, a crystal wafer of 50 μm in thickness can be produced with satisfactory parallelization and flatness by preliminarily bonding a crystal to a thick substrate with an adhesive and then polishing the crystal. Though this technique realizes a microchannel spatial light modulator having good resolution, another problem of increase in a voltage applied to the electrode has arisen. This problem is caused by the fact that part of the electric field caused by the electric charge image is developed in the adhesive layer, whereas the electric field should be developed only in the crystal.

In general, output light intensity from the electro-optic crystal periodically varies with a voltage applied to the crystal. A "half-wave voltage" which corresponds to the difference between a maximum and minimum of the output light intensity is also called the "operational voltage". For example, in the case that the operational volage is 2 kV, crystal thickness is 50 μm, and thickness of the adhesive layer is 3 μm, a voltage to be applied to the electrode 91 of the device 3 amounts to more than 3.5 kV. Such a high voltage causes a problem of voltage breakdown of the device 3.

SUMMARY OF THE INVENTION

An object of the present innvention is to provide spatial light modulating devices comprising a thinner electro-optic crystal, which can realize high spatial resolution and operate with application of relatively low voltage to the electro-optic crystal.

A spatial light modulating device according to the present invention has light modulating means which comprises: a substrate which is transparent with respect to readout light and whose first surface is coated with a first transparent conductive film; an electro-optic crystal plate whose first surface being opposed to the first surface of the substrate is coated with a second transparent conductive film; an adhesive layer for bonding the substrate and the electro-optic crystal plate; and conductive substances disposed in the adhesive layer so as to electrically connect the first and second transparent conductive films.

Other and further objects, features and advantages of the invention will appear more fully from the following description taken in connection with the accompanying drawings.

DETAILED DESCRIPTION OF THE PREFERRED EMBODIMENTS

Embodiments of the present invention will be described hereinafter with reference to the drawings.

Figure 3:
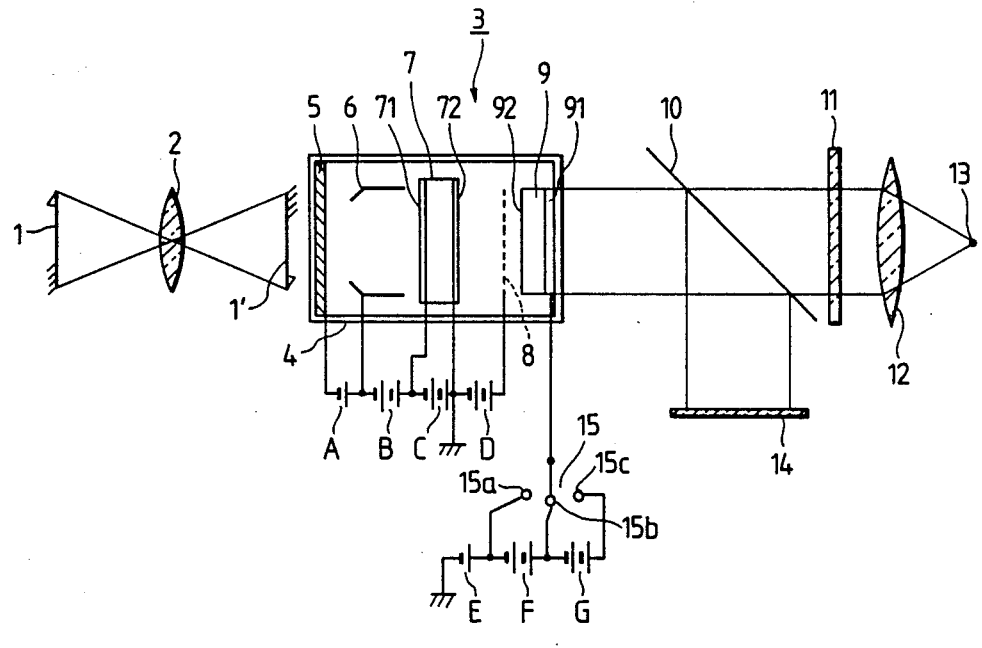
FIG. 3 is a schematic diagram showing the whole constitution of a microchannel spatial light modulator.
Figure 4A:
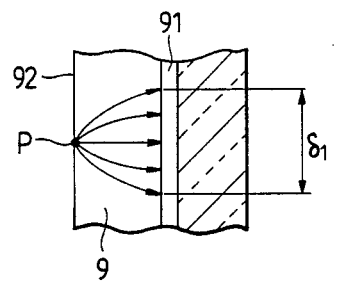
FIG. 4A and 4B are cross-sectional views showing the relation between thickness of an electro-optic crytal and spatial resolution.
Figure 4B:
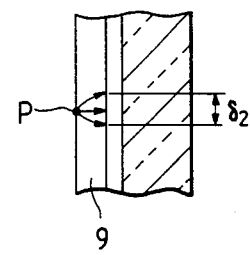
Figure 5:
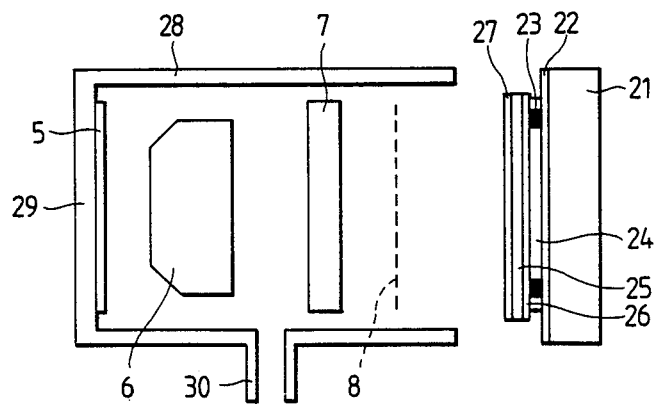
FIG. 5 is a cross-sectional view schematically showing the constitution and manufacturing method of a microchannel spatial light modulator according to an embodiment of the present invention.
Figure 6:
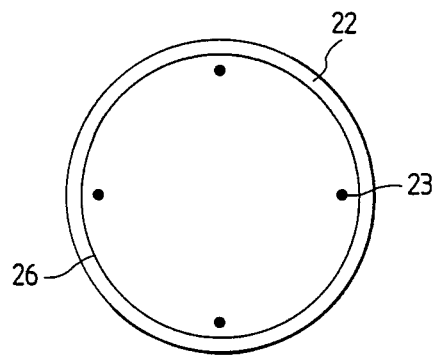
FIG. 6 is a plan view showing the interface structure between an electro-optic crystal and a glass substrate.

FIG. 5 is a cross-sectional view schematically showing a microchannel spatial light modulator according to an embodiment of the present invention. FIG. 6 is a plan view showing the interface structure between an electro-optic crystal 25 and a glass substrate 21 of the microchannel spatial light modulator shown in FIG. 5. In FIG. 5, the same parts as those in FIG. 3 are designated by like reference numerals and explanation for those parts will be omitted.

In FIG. 5, the reference numeral 22 and 26 denote transparent conductive films; 23, aluminum dots; 24, an adhesive layer; and 27, a dielectric mirror. The dielectric mirror 27 reflects readout light to increase the intensity of reflected readout light, and also has other functions of preventing the readout light from reaching the writing side (photocathode 5) and of storing electric charges.

The microchannel spatial light modulator of FIG. 5 is manufactured as follows. First, one end of a cylindrical glass tube 28, e.g., 35 mm in diameter and 100 mm in length is closed by a circular glass plate 29. Then, a focusing electrode 6 of approximately cylindrical shape, a microchannel plate (MCP) 7, and a mesh-like electron-trapping electrode 8 are in turn incorporated into the cylindrical glass tube 28.

Figure 2:
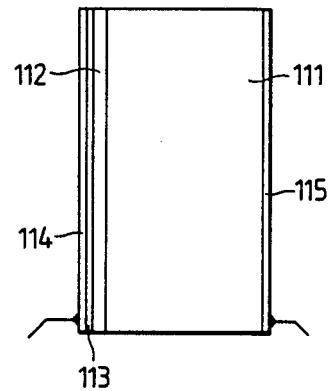

A light modulating part is manufactured as follows. The transparent conductive film 22 made of ITO (Indium Tin Oxide) is formed on one surface of the glass substrate 21 of 38 mm in diameter and 10 mm in thickness, both of whose surfaces have been polished to mirror surfaces. (The glass substrate 21 is used to close the other end of the cylindrical glass tube 28 at the final stage of manufacturing.) Then, as shown in FIG. 2, the aluminum dots 23 of 1 mm in diameter and 2 μm in thickness are vacuumdeposited on a periphery of the transparent conductive film 22.

On the other hand, one surface of the electro-optic crystal plate 25 ($LiNbO_3$ single crystal plate) is polished to a mirror surface and the transparent conductive film 26 is formed thereon.

Then, the glass substrate 21 and the electro-optic crystal plate 25, which have been treated as described above, are bonded with such transparent adhesive 24 as acrylic type or epoxy type in such a manner that the transparent conductive films 22 and 26 are opposed to each other and also the transparent conductive film 26 and the aluminum dots 23 are electrically connected to each other. After the adhesive 24 has been set, the other surface of the electro-optic crystal 25 is polished to a mirror surface of 50 to 80 μm in thickness with good parallelization between its two surfaces of less than 2 to 3 seconds. After the polishing, the dielectric mirror 27 made of $SiO_2$-$ZrO_2$ multi-layer is formed on the above-polished surface of the crystal plate 25. Then, a photocathode 5 is formed on the inner surface of the circular glass plate 29.

The light modulating part which is manufactured above is next incorporated in the cylindrical glass tube, where the cylindrical glass tube is sealed by the glass substrate 21. Finally, the inside of the cylindrical glass tube 28 is exhausted through a tube 30 by a vacuum pump machine.

As described in the foregoing, the thinner electro-optic crystal plate 25 of 50 to 80 μm in thickness can be satisfactorily manufactured by polishing the crystal 25 in the state that the crystal 25 is bonded to the glass substrate 21. Moreover, a voltage drop in the adhesive layer 24 can be prevented by attaining the electrical conduction between the transparent conductive film 22 on the glass substrate 21 and the transparent conductive film 26 on the electro-optic crystal plate 25, thereby reducing a voltage applied to the electro-optic crystal plate 25.

The number of the aluminum dots may be arbitrary selected and may be changed as occasion demands. The aluminum dots 23 may be replaced by conductive paint such as a silver paste, or graphite powder to obtain the similar effect.

In the microchannel spatial light modulator manufactured as described above, the spatial resolution of 10 lp/mm has been obtained. Moreover, the voltage applied to the electro-optic crystal plate has been reduced to 1.9 to 24. kV from 3.5 kV which was needed with the conventional device, thereby eliminating a voltage breakdown problem of the device.

Figure 1:
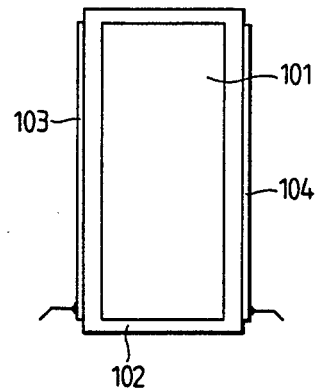
FIG. 1 and 2 shows cross-sectional views showing conventional spatial light modulating devices which utilize electro-optic crystals.

While the foregoing description is made for the microchannel spatial light modulator, the present invention can also be applied to other spatial light modulating devises which utilize the electro-optic crystal, for example, the devices shown in FIG. 1 and 2. That is, the above-described structure of the invention can be employed at the readout side of these devices.

Figure 7:
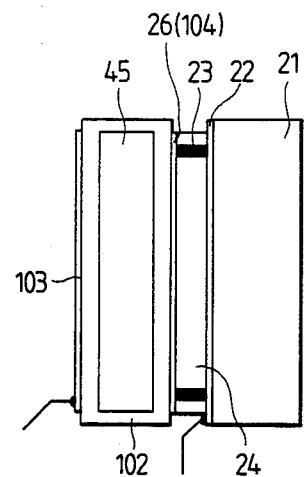
FIG. 7 is a cross-sectional view schematically showing the constitution of a spatial light modulating device of "PROM" structure according to an embodiment of the invention.

FIG. 7 is a cross-sectional view schematically showing the constitution of an embodiment in which the invention is applied to the device of FIG. 1. In FIG. 7, the same reference numerals as those in FIG. 1 and 5 designate like parts. With this structure, a thinner BSO single crystal plate 45 can be manufactured and the higher spatial resolution and lower application voltage to the crystal plate 45 can be realized.

Figure 8:
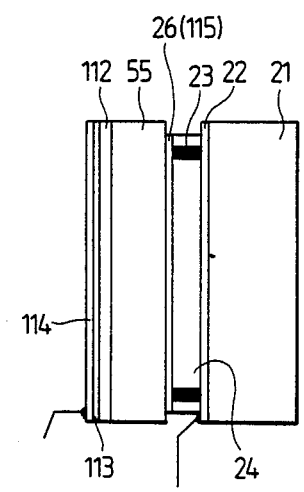
FIG. 8 is a cross-sectional view schematically showing the constitution of a spatial light modulating device of "Photo-Titus" structure according to an embodiment of the invention.

FIG. 8 is a cross-sectional view schematically showing the constitution of another embodiment in which the invention is applied to the device of FIG. 2. In FIG. 8, the same reference numerals as those in FIG. 2 and 5 designate like parts. With this structure, in the same manner, a thinner DKDP crystal plate 55 can be manufactured and the similar advantages can be obtained.

What is claimed is:

1. A spatial light modulating device, comprising light modulating means which comprises:
   a substrate which is transparent with respect to readout light and whose first surface is coated with a first transparent conductive film;
   an electro-optic crystal plate whose first surface being opposed to said first surface of said substrate is coated with a second transparent conductive film;
   an adhesive layer for bonding said substrate and said electro-optic crystal plate; and
   conductive substances disposed in said adhesive layer so as to electrically connect said first and second transparent conductive films.

2. A spatial light modulating device as claimed in claim 1, wherein said conductive substances are aluminum dots.

3. A spatial light modulating device as claimed in claim 1, wherein said light modulating means further comprises a dielectric mirror formed on a second surface of said electro-optic crystal plate, and said device further comprises:
   a photocathode for emitting electron beams carrying an electron image which corresponds to an input optical image;
   a focusing electrode for focusing said electron beams onto said dielectic mirror; and
   a mesh electrode for trapping secondary electrons emitted from said dielectric mirror.

4. A spatial light modulating device as claimed in claim 3, further comprising a microchannel plate disposed between said focusing electrode and said mesh electrode, for amplifying said electron beams.

5. A spatial light modulating device as claimed in claim 1, wherein said light modulating means further comprises:
   a third transparent conductive film formed on a second surface of said electro-optic crystal plate through an insulator layer; and
   said insulator layer disposed between said electro-optic crystal plate and each of said second and third transparent conductive films.

6. A spatial light modulating device as claimed in claim 5, wherein said electro-optic crystal plate further exhibits a photoconductive effect.

7. A spatial light modulating device as claimed in claim 1, wherein said light modulating means further comprises:
   a dielectric mirror formed on a second surface of said electro-optic crystal plate;
   a photoconductive layer formed on said dielectric mirror; and
   a third transparent conductive film formed on said photoconductive layer.

* * * * *